United States Patent
Kim

(10) Patent No.: US 10,464,546 B2
(45) Date of Patent: Nov. 5, 2019

(54) APPARATUS AND METHOD FOR DETERMINING FAILURE OF ENGINE CLUTCH

(71) Applicant: Hyundai Motor Company, Seoul (KR)

(72) Inventor: Yong Hyun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 524 days.

(21) Appl. No.: 15/359,705

(22) Filed: Nov. 23, 2016

(65) Prior Publication Data

US 2018/0050680 A1 Feb. 22, 2018

(30) Foreign Application Priority Data

Aug. 22, 2016 (KR) .................. 10-2016-0106114

(51) Int. Cl.
| | |
|---|---|
| *B60W 20/10* | (2016.01) |
| *B60K 6/387* | (2007.10) |
| *B60W 20/20* | (2016.01) |
| *G07C 5/08* | (2006.01) |
| *B60K 6/46* | (2007.10) |

(52) U.S. Cl.
CPC ............ *B60W 20/10* (2013.01); *B60K 6/387* (2013.01); *B60W 20/20* (2013.01); *G07C 5/08* (2013.01); *G07C 5/0808* (2013.01); *B60K 6/46* (2013.01); *B60W 2510/02* (2013.01); *B60W 2510/0638* (2013.01); *B60W 2510/081* (2013.01); *B60W 2510/1005* (2013.01); *B60W 2520/10* (2013.01); *B60W 2710/06* (2013.01); *B60Y 2200/92* (2013.01); *B60Y 2300/182* (2013.01); *B60Y 2300/192* (2013.01); *B60Y 2400/42* (2013.01); *Y10S 903/914* (2013.01)

(58) Field of Classification Search
CPC .. B60W 20/10; B60W 20/20; B60W 2510/02; B60W 2510/0638; B60W 2510/081; B60W 2510/1005; B60W 2520/10; B60W 2710/06; G07C 5/08; G07C 5/0808; B60K 6/387; B60K 6/46; B60Y 2200/92; B60Y 2300/182; B60Y 2300/192; B60Y 2400/42; Y10S 903/914
See application file for complete search history.

(56) References Cited

FOREIGN PATENT DOCUMENTS

| KR | 10-2013-0065417 A | 6/2013 |
|---|---|---|
| KR | 10-2014-0065080 A | 5/2014 |
| KR | 10-2015-0012151 A | 2/2015 |

*Primary Examiner* — Kimberly S Berona
*Assistant Examiner* — Michael V Kerrigan
(74) *Attorney, Agent, or Firm* — Mintz Levin Cohn Ferris Glovsky and Popeo, P.C.; Peter F. Corless

(57) ABSTRACT

An apparatus for determining a failure of an engine clutch is provided. The apparatus includes an engine clutch that is disposed between an engine generating power and a motor and a driving information detector that senses driving information including a shift speed stage, an engine speed, a motor speed, a SOC of a battery, and a vehicle speed. A controller then determines a driving mode of the engine from the detected driving information and determines whether oil leakage of the engine clutch is generated from the driving information and the driving mode.

15 Claims, 2 Drawing Sheets

APPARATUS AND METHOD FOR DETERMINING FAILURE OF ENGINE CLUTCH

CROSS-REFERENCE TO RELATED APPLICATION

This application claims priority to and the benefit of Korean Patent Application No. 10-2016-0106114 filed in the Korean Intellectual Property Office on Aug. 22, 2016, the entire contents of which are incorporated herein by reference.

BACKGROUND

(a) Field of the Invention

The present invention relates to an apparatus and a method for determining a failure of an engine clutch of a hybrid vehicle, and more particularly, to an apparatus and a method for determining a failure of an engine clutch for determining generation of oil leakage of a hydraulic pressure line inside the engine clutch.

(b) Description of the Related Art

A hybrid electric vehicle may have various structures using two or more power sources including an engine and a motor. The hybrid electric vehicle uses a power train in a manner of a transmission mounted electronic device (TMED) in which a motor, and a transmission and a drive shaft, are connected in series. In addition, a clutch is disposed between the engine and the motor. Based on whether the clutch is engaged, the hybrid electric vehicle is driven in an electric vehicle (EV) mode or in a hybrid electric vehicle (HEV) mode. The EV mode is a mode in which a vehicle is driven by driving torque of a motor. The HEV mode is a mode in which the vehicle is driven by driving torque of the motor and the engine.

The EV mode and the HEV mode are entered by engagement or release of the engine clutch disposed between the engine and the motor. In general, the engine clutch uses a hydraulic pressure type of clutch. In this hydraulic pressure type of clutch, a hydraulic pressure generated in a hydraulic pressure cylinder operates a spring of the clutch to release the engagement of the engine clutch. In contrast, when the hydraulic pressure is not generated in the hydraulic pressure cylinder, the engine clutch maintains the engagement state. In other words, the engine clutch maintains the engagement state (e.g., a normally close type) in the normal state.

However, when oil leakage is generated in the hydraulic pressure line supplied with the hydraulic pressure generated in the hydraulic pressure cylinder, insufficient hydraulic pressure is supplied to the spring of the clutch and thus, the engine clutch maintains the engagement state. Particularly, even when an engine clutch release command is applied from a hybrid controller (HCU) of the vehicle to release the engagement of the engine clutch, the engine clutch maintains the engagement state. As described above, when the engine clutch is unintentionally engaged by the driver, the vehicle may propel forward unintentionally. Accordingly, a separate hydraulic pressure sensor has typically been installed in the hydraulic pressure line, causing a manufacturing cost of the vehicle to increase.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method for determining a failure of an engine clutch for preventing the vehicle from being unintentionally propelled (e.g., launched) by determining whether oil leakage is generated in the hydraulic pressure line of the engine clutch without requiring a separate hydraulic pressure sensor. Additionally, the present invention provides an apparatus and a method for determining a failure of an engine clutch capable of determining oil leakage of the hydraulic pressure line without usage of a separate sensor measuring the hydraulic pressure of the hydraulic pressure line of the engine clutch.

An apparatus for determining a failure of an engine clutch according to an exemplary embodiment of the present invention may include: an engine clutch disposed between an engine generating power and a motor; a driving information detector configured to sense driving information including a shift speed stage, an engine speed, a motor speed, a state of charge (SOC) of a battery, and a vehicle speed; and a controller configured to determine a driving mode of the engine from the driving information detected by the driving information detector and determine whether oil leakage of the engine clutch is generated from the driving information and the driving mode.

The controller may further be configured to determine that the oil leakage is generated in a hydraulic pressure line of the engine clutch when a shift speed stage is a driving stage, a driving mode of the engine is not a power assist mode for running of the vehicle at a predetermined speed, and a difference of an engine speed and a motor speed is less than a predetermined value. Additionally, the controller may be configured to determine the oil leakage condition only when the vehicle speed is equal to or less than a predetermined speed. The controller may then be configured to turn off the engine to be driven in an electric vehicle (EV) mode in response to determining that the oil leakage is generated in the hydraulic pressure line of the engine clutch.

The controller may be configured to operate the engine to be driven with a hybrid electric vehicle mode (HEV mode) when the oil leakage release condition is satisfied while the vehicle is driving in the EV mode. The controller may be configured to determine that the oil leakage release condition is satisfied when the motor speed is a predetermined speed or greater during a predetermined period of time, the shift speed stage is the driving stage, and the difference of the engine speed and the motor speed is a predetermined value or greater. The controller may then be configured to operate the engine to be driven in the HEV mode when the oil leakage release condition is satisfied.

A method for determining a failure of an engine clutch of a hybrid vehicle according to another exemplary embodiment of the present invention may include: sensing driving information including a shift speed stage, an engine speed, a motor speed, and a vehicle speed; determining a driving mode of an engine from the driving information; and determining whether oil leakage is generated in a hydraulic pressure line of an engine clutch disposed between an engine and a motor from the driving information and the driving mode.

When the shift speed stage is the driving stage, the driving mode of the engine is a power assist mode for driving of the vehicle over a predetermined speed, and a difference of the engine speed and the motor speed is less than a predetermined value, it may be determined that the oil leakage is generated in a hydraulic pressure line of the engine clutch. In addition, the oil leakage in the hydraulic pressure line of the engine clutch may be detected when the vehicle speed is equal to or less than a predetermined speed.

The method may further include turning off the engine to be operated in an electric vehicle (EV) mode in response to determining that the oil leakage is generated in the hydraulic pressure line of the engine clutch. The method may further include: determining whether the oil leakage release condition is satisfied during the driving with the EV mode; and operating the engine when the oil leakage release condition is satisfied to be operated in the hybrid electric vehicle (HEV) mode. The oil leakage release condition may be satisfied when the motor speed is a predetermined speed or greater during a predetermined period of time, a shift speed stage is a driving stage, and a difference of the engine speed and the motor speed is a predetermined value or greater.

According to the apparatus and the method for determining the failure of the engine clutch according to an exemplary embodiment of the present invention, the oil leakage in the hydraulic pressure line of the engine clutch may be detected without requiring use of a separate hydraulic pressure sensor. Additionally, by determining the generation of the oil leakage in the hydraulic pressure line of the engine clutch, the vehicle may be prevented from being unintentionally propelled by the driver. Further, by omitting the additional hydraulic pressure sensor measuring the hydraulic pressure of the engine clutch, a manufacturing cost of the vehicle may be reduced.

BRIEF DESCRIPTION OF THE DRAWINGS

The drawings are provided for reference in describing an exemplary embodiment of the present invention, so it should not be construed that the technical spirit of the present invention is limited to the accompanying drawings.

DETAILED DESCRIPTION

Figure 1:
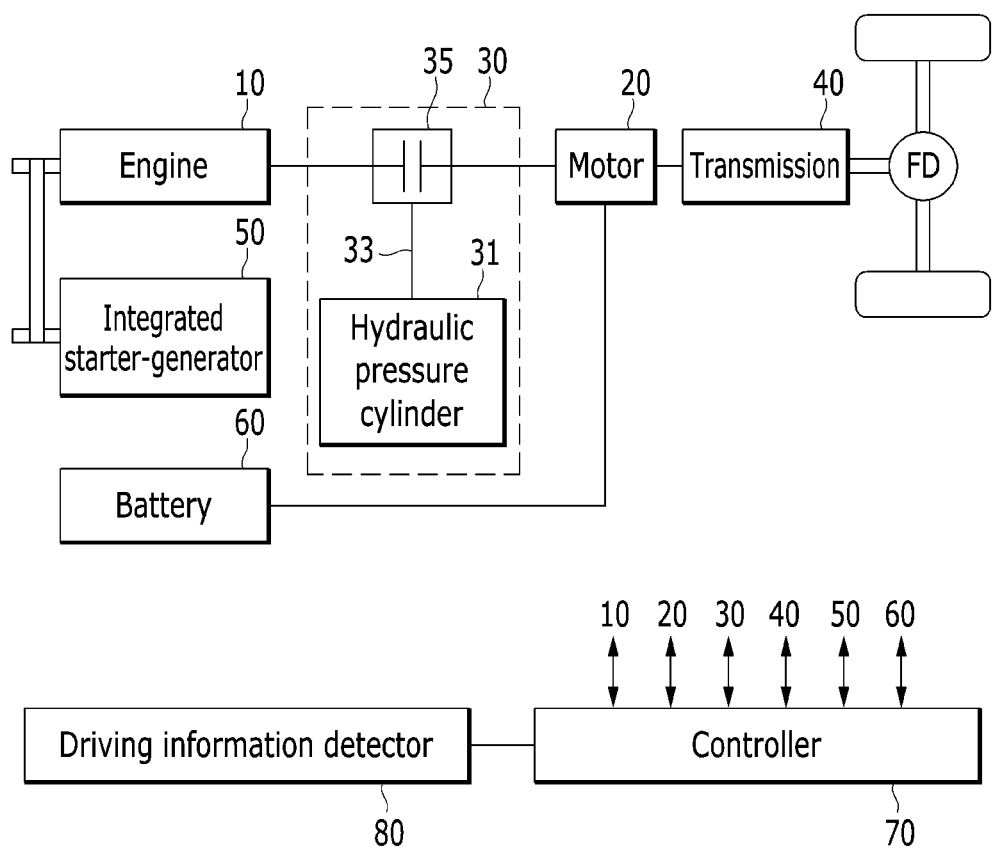
FIG. 1 is a block diagram of an apparatus for determining a failure of an engine clutch according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

To clearly describe the present invention, parts that are irrelevant to the description are omitted. Like numerals refer to like or similar constituent elements throughout the specification. The size and the thickness of each component illustrated in the drawings are arbitrarily illustrated in the drawings for better understanding and ease of description, but the present invention is not limited to the illustration. In the drawings, the thicknesses of various portions and regions are enlarged for clarity.

Now, an apparatus for determining a failure of an engine clutch according to an exemplary embodiment of the present invention will be described with reference to accompanying drawings. FIG. 1 is a block diagram of an apparatus for determining a failure of an engine clutch according to an exemplary embodiment of the present invention. As shown in FIG. 1, the apparatus for determining the failure of the engine clutch according to an exemplary embodiment of the present invention may include an engine 10, a motor 20, an engine clutch 30, a driving information detector 80, and a controller 70.

The engine 10 combusts a fuel to generate power and starts by an integrated starter-generator 50. Additionally, the engine is operated as a generator when the engine 10 starts to generate electrical energy. The integrated starter-generator 50 is referred to as a hybrid starter and generator (HSG) or an integrated starter and generator (ISG). The motor 20 assists the power of the engine 10 and is operated by the generator during vehicle braking to generate electrical energy. The electrical energy generated through the HSG and the motor 20 is converted and transmitted to a battery 60.

Further, the engine clutch 30 is disposed between the engine 10 and the motor 20 to selectively transmit the power of the engine 10 to the motor 20. In other words, the hybrid vehicle may be driven in an electric vehicle (EV) mode or a hybrid electric vehicle (HEV) mode based on the engagement of the engine clutch 30. The EV mode is a mode in which the vehicle drives by a driving torque of the motor 20, and the HEV mode is a mode in which the vehicle drives by the driving torque of the motor 20 and the engine 10. The engine clutch 30 may be a hydraulic pressure type of clutch operated by hydraulic pressure. The engine clutch 30 may include a hydraulic pressure cylinder 31 configured to generate the hydraulic pressure, a hydraulic pressure line 33 through which the hydraulic pressure generated from the hydraulic pressure cylinder 31 flows, and a disk 35 operated by the hydraulic pressure passing through the hydraulic pressure line 33. The hydraulic pressure cylinder 31 may be operated by a control signal of the controller 70.

The engine clutch 30 may remain engaged the engagement state in the normal state. In other words, in the normal state, since the hydraulic pressure is not generated by the hydraulic pressure cylinder 31 and the hydraulic pressure does not flow to the hydraulic pressure line 33, the disk 35 may be released. In contrast, when the hydraulic pressure is generated by the hydraulic pressure cylinder 31, the hydraulic pressure flows to the hydraulic pressure line 33 and the disk 35 may be engaged.

The motor 20 is connected with a transmission 40 to transmit the driving torque of the engine 10 and/or the driving torque of the motor 20 to the transmission 40. The transmission 40 may be configured to adjust a magnitude of the driving torque transmitted from the engine 10 and/or the motor 20. The drive shaft may be configured to transmit the driving torque transmitted from the transmission 40 to the wheels (not shown) to drive the hybrid vehicle. In other words, the engagement of the engine clutch 30 may be released in the electric vehicle mode to drive the vehicle by the driving torque of the motor 20, however the engine clutch 30 may be engaged in the hybrid vehicle mode to drive the vehicle by the driving torque of the engine 10 and the motor 20.

The driving information detector 80 may be configured to sense driving information including a shift speed stage, an engine speed, a motor speed, and a vehicle speed, and the driving information may be transmitted to the controller 70. The driving information detector 80 may be a sensor mounted within the vehicle and configured to detect the driving information. The controller 70 may be configured to operate the engine 10, the motor 20, the engine clutch 30, the integrated starter-generator 50, and the transmission 40. The controller 70 may be configured to determine the driving mode of the engine 10 from the driving information, and determine whether the oil leakage is generated in the hydraulic pressure line 33 from the driving information and the driving mode.

Accordingly, the controller 70 may be provided with at least one processor operated by a predetermined program, and the predetermined program is configured to perform each step of a method for determining the failure of the engine clutch 30 according to an exemplary embodiment of the present invention. In particular, when the controller 70 satisfies the oil leakage condition, the oil leakage in the hydraulic pressure line 33 of the engine clutch 30 may be detected. When the shift speed stage is the driving stage, when the driving mode of the engine 10 is not a power assist mode for the driving of the vehicle over a predetermined speed, and when a difference of the engine speed and the motor speed is less than a predetermined value, the oil leakage condition may be determined to be satisfied.

When the shift speed stage is the driving stage indicates that the shift speed stage is not a parking stage or a neutral stage. The driving condition of the engine 10 may include a charging mode, an air conditioning mode, and a power assist mode. The charging mode is a mode of driving the engine 10 for charging the battery 60 when a charging state (state of charge: SOC) of the battery 60 is less than a predetermined value. In the charging mode, the engine clutch 30 is in the released state. The air conditioning mode is a mode of operating an air conditioner by manipulation of the driver. In the air conditioning mode, the engine clutch 30 is in the released state. The power assist mode is used to drive the vehicle in the HEV mode by transmitting the power of the engine 10 and the engine clutch 30 is in the engagement state. In other words, the controller 70 may be configured to determine whether the oil leakage is generated in the hydraulic pressure line 33 when (the charging mode or the air conditioning mode) that it is not the power assist mode operated by the hydraulic pressure cylinder 31 to release the engine clutch 30.

Hereinafter, the method for determining the failure of the engine clutch according to an exemplary embodiment of the present invention will be described in detail with reference to accompanying drawings.

Figure 2:
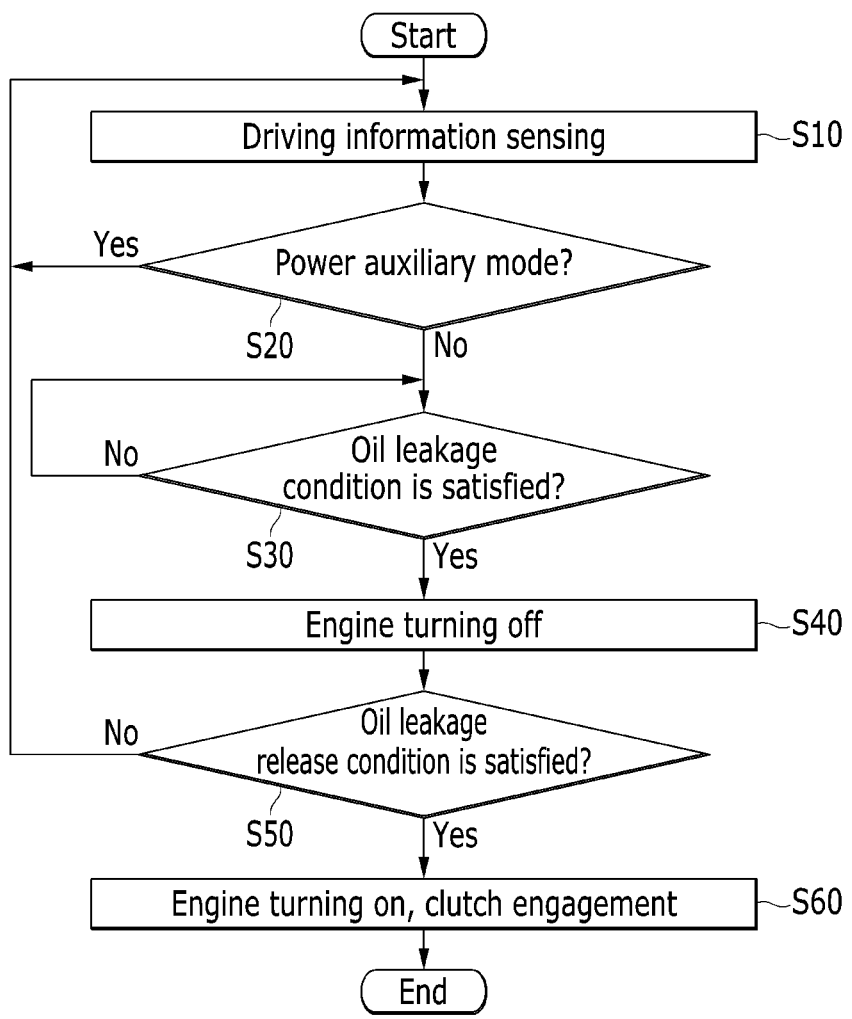
FIG. 2 is a flowchart showing a method for determining the failure of the engine clutch according to an exemplary embodiment of the present invention.

FIG. 2 is a flowchart showing a method for determining the failure of the engine clutch according to an exemplary embodiment of the present invention. As shown in FIG. 2, the method may include sensing, by the driving information detector 80, the driving information including the shift speed stage, the engine speed, the motor speed, and the vehicle speed (S10), and the sensed driving information may be transmitted to the controller 70.

The method may then include determining, by the controller 70, whether the driving mode of the engine 10 is the power assist mode from the driving information (S20). In other words, the controller 70 may be configured to determine whether the oil leakage is generated in the hydraulic pressure line 33 only when the driving mode of the engine 10 is the charging mode or the air conditioning mode that is not the power assist mode. When the oil leakage condition is satisfied, the method may include determining, by the controller 70, that the oil leakage is generated in the hydraulic pressure line 33 (S30), and the oil leakage condition may be satisfied when the shift speed stage is the driving stage, when the driving mode of the engine 10 is not the power assist mode for the driving of the vehicle at the predetermined speed, and when the difference of the engine speed and the motor speed is less than the predetermined value.

In other words, when the shift speed stage of the transmission 40 enters into the driving stage that is not a parking stage or a neutral stage and the driving mode of the engine 10 is the charging mode or the air conditioning mode that is not the power assist mode, the controller 70 may be configured to compare the difference of the engine speed and the motor speed and determine that the oil leakage is generated in the hydraulic pressure line 33 when the difference of the engine speed and the motor speed is less than the predetermined value.

Particularly, the controller 70 may be configured to determine that the oil leakage is generated in the hydraulic pressure line 33 only when the oil leakage condition is satisfied during a predetermined period of time (e.g., about 2 seconds).

When the driving mode of the engine 10 is not the power assist mode, indicates that the engine clutch 30 is in the released state such that the hydraulic pressure must be supplied to the hydraulic pressure line 33 by the hydraulic pressure cylinder 31. In particular, w the difference of the engine speed and the motor speed is less than the predetermined value indicates that the engine speed and the motor speed are synchronized by the engagement of the engine clutch 30. Accordingly, the controller 70 may be configured to determine that the oil leakage is generated in the hydraulic pressure line 33 of the engine clutch 30 to engage the engine clutch 30, and then the engine speed and the motor speed may be synchronized.

In particular, since the engine speed and the motor speed may be synchronized by the temporary engagement of the engine clutch 30, and the oil leakage condition may be maintained during the predetermined time, the oil leakage generated in the hydraulic pressure line 33 of the engine clutch 30 may be determined. Meanwhile, when the vehicle speed is the predetermined speed or greater, the engine speed and the motor speed may be frequently synchronized. Accordingly, when the vehicle speed is less than the predetermined speed (e.g., about 5 kph), the oil leakage condition may be determined.

In the step S30, when the oil leakage condition is satisfied, the controller 70 may be configured to turn off the engine 10 to operate the vehicle to be driven in the EV mode S40. When the oil leakage is generated in the hydraulic pressure line 33 of the engine clutch 30, since the engine clutch 30 maintains the engagement state, the vehicle may be propelled by the operation of the engine 10 regardless of the intension of the driver. Accordingly, the operation of the engine 10 may be turned off.

While the operation of the engine 10 is turned off to operate the vehicle in the EV mode, the controller 70 may be configured to determine whether the oil leakage release condition is satisfied (S50). The oil leakage release condition may be satisfied when the motor speed is the predetermined speed or greater during the predetermined period of time, the shift speed stage is the driving stage, and the difference of the engine speed and the motor speed is the predetermined value or greater.

When the oil leakage is generated in the hydraulic pressure line 33 of the engine clutch 30, since the engine clutch 30 maintains the engagement state, the engine speed and the motor speed must be synchronized. However, after the engine speed and the motor speed are synchronized by a temporary cause, the engine clutch 30 may be normalized. In particular, when the engine clutch 30 is normalized in which the hydraulic pressure is supplied to the hydraulic pressure line 33, since the engine clutch 30 is released, the difference of the engine speed and the motor speed is greater than the predetermined value.

Accordingly, when the controller 70 determines that the engine clutch 30 is the normal state, similar to a normal running state before the failure is generated in the engine clutch 30, the controller 70 may be configured to drive the engine 10, and when necessary, may be configured to engage the engine clutch 30 to operate the vehicle to be driven in the EV mode or the HEV mode (S60).

As described above, according to the apparatus and the method for determining the failure of the engine clutch according to an exemplary embodiment of the present invention, whether the oil leakage is generated in the hydraulic pressure line 33 of the engine clutch 30 may be determined without the use of an additional hydraulic pressure sensor, thereby reducing the manufacturing coat of the vehicle. In addition, the oil leakage may be prevented from being generated in the hydraulic pressure line 33 of the engine clutch 30 and thus the vehicle may be prevented from being abnormally propelled forward without driver intention.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

10: engine
20: motor
30: engine clutch
31: hydraulic pressure cylinder
33: hydraulic pressure line
35: disk
40: transmission
50: integrated starter-generator
60: battery
70: controller
80: driving information detector

What is claimed is:

1. An apparatus for determining a failure of an engine clutch, comprising: an engine clutch disposed between an engine generating power and a motor; a driving information detector configured to sense driving information including a shift speed stage, an engine speed, a motor speed, a state of charge (SOC) of a battery, and a vehicle speed; and a controller configured to determine a driving mode of the engine from the detected driving information and determine whether oil leakage of the engine clutch is generated from the driving information and the driving mode; wherein the controller is configured to turn off the engine to be driven in an electric vehicle (EV) mode in response to determining that the oil leakage is generated in the hydraulic pressure line of the engine clutch.

2. The apparatus of claim 1, wherein the controller is configured to determine that the oil leakage is generated in a hydraulic pressure line of the engine clutch when a shift speed stage is a driving stage, a driving mode of the engine is not a power assist mode for running the vehicle at a predetermined speed, and a difference of an engine speed and a motor speed is less than a predetermined value.

3. The apparatus of claim 2, wherein the controller is configured to determine the oil leakage is present further when the vehicle speed is equal to or less than a predetermined speed.

4. The apparatus of claim 1, wherein the controller is configured to operate the engine to be driven in a hybrid electric vehicle (HEV) mode when an oil leakage release condition is satisfied while the vehicle is being driven in the EV mode.

5. The apparatus of claim 4, wherein the controller is configured to determine that the oil leakage release condition is satisfied when the motor speed is a predetermined speed or greater for a predetermined period of time, the shift speed stage is a driving stage, and a difference of the engine speed and the motor speed is a predetermined value or greater.

6. The apparatus of claim 5, wherein the controller is configured to operate the engine to be driven in the HEV mode when the oil leakage release condition is satisfied.

7. A method for determining a failure of an engine clutch of a hybrid vehicle, comprising: sensing, by a driving information detector, driving information including a shift speed stage, an engine speed, a motor speed, and a vehicle speed; determining, by a controller, a driving mode of an engine from the detected driving information; determining, by the controller, whether oil leakage is generated in a hydraulic pressure line of an engine clutch disposed between an engine and a motor from the driving information and the driving mode; and turning off, by the controller, the engine to be driven in an electric vehicle (EV) mode in response to determining that the oil leakage is generated in the hydraulic pressure line of the engine clutch.

8. The method of claim 7, further comprising:
determining, by the controller, that the oil leakage is generated in the hydraulic pressure line of the engine clutch when the shift speed stage is a driving stage, the driving mode of the engine is a power assist mode for driving of the vehicle over a predetermined speed, and a difference of the engine speed and the motor speed is less than a predetermined value.

9. The method of claim 8, wherein the oil leakage generated in the hydraulic pressure line of the engine clutch is further determined when the vehicle speed is equal to or less than a predetermined speed.

10. The method of claim 7, further comprising:
determining, by the controller, whether an oil leakage release condition is satisfied during the driving of the vehicle in the EV mode; and
operating, by the controller, the engine to be driven in the hybrid electric vehicle (HEV) mode when the oil leakage release condition is satisfied.

11. The method of claim 10, wherein the oil leakage release condition is satisfied when the motor speed is a predetermined speed or greater for a predetermined period of time, a shift speed stage is a driving stage, and a difference of the engine speed and the motor speed is a predetermined value or greater.

12. A non-transitory computer readable medium containing program instructions executed by a controller for determining a failure of an engine clutch of a hybrid vehicle, the computer readable medium comprising: program instructions that control a driving information detector to sense driving information including a shift speed stage, an engine speed, a motor speed, and a vehicle speed; program instructions that determine a driving mode of an engine from the detected driving information; program instructions that determine whether oil leakage is generated in a hydraulic pressure line of an engine clutch disposed between an engine and a motor from the driving information and the driving mode; and program instructions that turn off the engine to be driven in an electric vehicle (EV) mode in response to determining that the oil leakage is generated in the hydraulic pressure line of the engine clutch.

13. The non-transitory computer readable medium of claim 12, further comprising:
program instructions that determine that the oil leakage is generated in the hydraulic pressure line of the engine clutch when the shift speed stage is a driving stage, the driving mode of the engine is a power assist mode for driving of the vehicle over a predetermined speed, and a difference of the engine speed and the motor speed is less than a predetermined value.

14. The non-transitory computer readable medium of claim 13, wherein the oil leakage generated in the hydraulic pressure line of the engine clutch is further determined when the vehicle speed is equal to or less than a predetermined speed.

15. The non-transitory computer readable medium of claim 12, further comprising:
program instructions that determine whether an oil leakage release condition is satisfied during the driving of the vehicle in the EV mode; and
program instructions that operate the engine to be driven in the hybrid electric vehicle (HEV) mode when the oil leakage release condition is satisfied.

* * * * *